UNITED STATES PATENT OFFICE 2,104,492

LIGHT FILTER

Erich Merkel, Wuppertal-Barmen, and Christian Wiegand, Wuppertal-Elberfeld, Germany, assignors to Winthrop Chemical Company Inc., New York, N. Y., a corporation of New York No Drawing. Application March 17, 1934, Serial No. 716,172. In Germany March 31, 1933

13 Claims. (Cl. 167—90)

This invention relates to media protecting the human skin, especially to those in which the light absorbing substance is embedded in organic, film-forming substances.

It has been suggested to employ colored or uncolored substances, such as phenols or naphthols as screening means for this purpose but substances of this kind require either rather thick layers or an unduly high concentration for attaining the desired effect and especially filter off also ranges of the spectrum the exclusion of which is not desired, thus preventing the skin from becoming tanned.

We have now found that highly efficient media suitable for protecting the human skin, which exclude the rays of the spectrum which are nocuous to the human skin without excluding valuable rays which effect the tanning of the skin, can be obtained by dissolving in a compatible solvent, preferably in an organic film-forming substance, a practically colorless, organic absorptive product, soluble in said solvent or film-forming substance and possessing a strong absorption of ultraviolet rays and a high and simultaneously steep slope of the absorption curve in the range between about 320 and about 350 m$\mu$, preferably at about 325 m$\mu$, said slope corresponding to an increase of the logarithm of the molar extinction coefficient by $lg\epsilon=$ at least 1 within a range of 10 m$\mu$. By the term molar extinction coefficient the valve $\epsilon$ is meant which corresponds to the formula $$\epsilon = \frac{1}{c \cdot d} \cdot lg \frac{J_o}{J}$$

in which $c$ denotes the molecular concentration of the body employed in the solvent used $$\left(\frac{mol.}{liter\ of\ solvent}\right)$$

$d$ denotes the diameter (measured in centimeters) of the layer between parallel planes, which is passed by the rays vertically radiated thereon, $J_o$ denotes the intensity of the light radiated on the filter and $J$ denotes the intensity of the light that comes out of the filter. The term "strong" absorption of rays means that $lg\epsilon$ corresponds to a value of at least 3.2 and is practically the same within a range of at least 30 m$\mu$.

By the usual optical methods of absorption measurement (compare, for instance, Weigert, "Optische Methoden der Chemie" (1927) pages 182, 205, 223) compounds possessing such a high and steep slope of the absorption curve within a range of the wave length between 320 to 350 m$\mu$ may easily be found. Suitable are, for instance, mostly the organic compounds corresponding to the general formula

in which R denotes an aromatic nucleus and X denotes either nitrogen or a methine group. The compounds of the said structure, therefore, correspond more specifically to the general formulae:

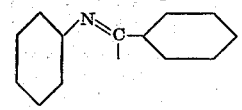 and 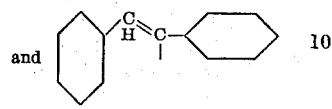

in which the phenyl nuclei shown may be replaced by naphthyl or similar condensed aromatic nuclei all of which nuclei may bear the most different substituents; such a product is, for example, stilbene

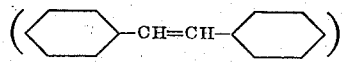

which may be usefully employed for the aforesaid purposes. In most cases compounds are, however, preferred in which the chains between the aromatic nuclei are portions of a nucleus, which means that products of the said type correspond to the general formula:

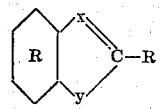

in which R denotes an aromatic nucleus, $x$ denotes nitrogen or a methine group, and $y$ denotes a member of from 1 to 2 groups, such as methylene, ethylene, oxygen, sulfur or an imido group. Those products are preferred in which the nucleus formed by the chain contains 5 members, so that $y$ is a monoatomic member, such as oxygen, sulfur, a methylene or an imido group, symmetrical as well as unsymmetrical compounds being in this case almost of the same efficiency as for example arylbenzimidazoles, arylbenzthiazoles, and 2-arylindols. A substitution of hydrogen in the aromatic nuclei by substituents, as for example alkyl, cycloalkyl, aryl, hydroxyl, alkyl- or arylether, halogen, carboxylic acid (either in the free state or in the neutralized state by esterification or formation of salts and the like), sulfuryl, sulfonic acid and other radicals, does not substantially change the character of the bodies for the purpose of the present invention. If some product employed should not uniformly give the desired strong absorption a combination of two or more products may be employed, the absorption of which, jointly, covers the range to be excluded.

The products employed according to the present invention are efficient in extremely thin layers as are formed for example by rubbing a solution, or liquid or salve-like dispersion thereof, onto the skin in contradistinction to the hitherto used rather thick layers of protective salves. For these purposes the bodies employed should be practically colorless and must be non-poisonous, that is they must neither poison nor irritate the skin or even wounds.

As film-forming substances suitable for use as vehicles for the products described the usual bases of skin creams or ointments may be employed. Such vehicles are for example purified wool fat or lard, aliphatic alcohols of high molecular weight, petroleum jelly, paraffin oil, vegetable oils or fats, either alone or in combination with each other and/or water and/or glycerine. For the sake of brevity the said vehicles having a more or less fatty consistency will be referred to in the following and in the claims as fatty vehicles. In most cases a content of the preparations of from about 2 to about 5% by weight of the absorptive substance will be sufficient, but if protection against particularly strong irradiation, as for example in heights of 2000 meters or more above sea level or by means of mercury arc lamps, is sought, the content may be increased to say 10 per cent and for ultimate protection metal oxides as for example the oxides of zinc, aluminium or titanium may be added. If desired, colored pigments, as for example oxides of iron may be further added for adapting the preparations to particular shades of the skin. It should be understood that no organic body of the type disclosed which gives either colorations or precipitates with iron compounds can be employed in accordance with the present invention. The attached claims are to be read in the light of this statement.

The following examples will serve to illustrate the nature of the present invention, but the invention is not restricted thereto:—

*Example 1.*—2.5 grams of phenylbenzimidazole sulfonic acid sodium salt are dissolved in 4 ccs. of distilled water whereupon about 95 grams of a homogeneous mixture of 10 parts by weight of wheat starch, 2 parts by weight of pulverized tragacanth, 15 parts by weight of water, 5 parts by weight of ethyl alcohol, and 100 parts by weight of glycerine are added. If the thinly liquid preparation is rubbed onto the skin in a layer of about 0.03 mm. thickness a tan coloration of the skin without the formation of an aching erythema is attained after an irradiation by the sun which, without the application of the preparation, leads to a highly aching erythema after the same period of irradiation. The same valuable effect is obtained even if the thickness of the protective layer be reduced to 0.01 mm. or be experimentally increased to 0.1 mm.

The aforesaid sodium salt shows a molar extinction of rays of a wave-length of 330 mμ of log ε=about 2.41 and a molar extinction of rays of a wave-length of 316 mμ of log ε=about 4.30, the logarithm of the extinction coefficient being thus altered within a range of 14 mμ by about 1.89 i. e. 1.35 within a range of 10 mμ. If desired, about 35 parts by weight of titanium oxide may be added to about each 100 parts of the aforesaid preparation.

*Example 2.*—3 grams of 2-(para-tolyl)-benzimidazole are dissolved in 97 parts of purified, anhydrous wool-fat. The effect of the preparation is the same as that of the preparation described in Example 1.

The said benzimidazole shows a molar extinction of rays of a wave-length of 330 mμ of log ε=about 2.43 and a molar extinction of rays of a wave-length of 320 mμ of log ε=about 4.14, i. e. log ε increases by 1.71 within a range of 10 mμ.

*Example 3.*—2.5 grams of 2-(para-methoxyphenyl)-benzimidazole are dissolved in 97.5 grams of purified, anhydrous wool-fat. The effect of the preparation is the same as that of the preparation described in Example 2.

The said benzimidazole shows a molar extinction of rays of a wave-length of 334 mμ of log ε=about 2.30 and a molar extinction of rays of a wave-length of 324 mμ of log ε=about 4.18, i. e. log ε increases by 1.88 within a range of 10 mμ.

Instead of the particularly efficient benzimidazoles, specifically referred to in this and the foregoing examples, the following compounds may also be used:

Stilbene,
2=phenylindole,
2=phenylbenzimidazole,
2=phenylbenzoxazole.

If a compound possessing the absorbing properties required does not cover the whole range of that part of the spectrum which is to be absorbed, for instance, if such a compound shows a minimum of absorption within the said part of the spectrum, a combination of two or more compounds may be used to bring about a full absorption of the part of the spectrum which is to be removed from the light rays. Thus, stilbene, which shows a minimum of absorption at about 240 mμ may be combined with an about equal quantity of α-phenylquinoline which shows a maximum of absorption at about 240 mμ.

We claim:—

1. A medium which protects the human skin from the noxious rays of ultra violet light but does not exclude the rays effecting tanning of the skin, which medium contains a fatty vehicle and, homogeneously dissolved therein as the light absorbing agent, a small quantity of a practically colorless, non-poisonous compound corresponding to the general formula

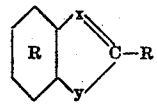

in which R denotes an aromatic radical, $x$ denotes nitrogen or a methine group and $y$ denotes a group of from 1 to 2 ring-members, which compound has a high and simultaneously steep slope of the absorption curve towards the shorter wave length in the range between about 320 and about 350 mμ, said slope corresponding to an increase of the logarithm of the molar extinction coefficient by at least 1 within a range of 10 mμ, so that at least the value 3.2 is reached.

2. A medium which protects the human skin from the noxious rays of ultra violet light but does not exclude the rays effecting tanning of the skin, which medium contains a fatty vehicle and, homogeneously dissolved therein as the light absorbing agent, a small quantity of a practically colorless, non-poisonous compound corresponding to the general formula

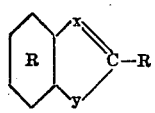

in which R denotes an aromatic radical, $x$ denotes nitrogen or a methine group and $y$ denotes a monoatomic member, which compound has a high and simultaneously steep slope of the absorption curve towards the shorter wave length in the range between about 320 and about 350 m$\mu$, said slope corresponding to an increase of the logarithm of the molar extinction coefficient by at least 1 within a range of 10 m$\mu$, so that at least the value 3.2 is reached.

3. A medium which protects the human skin from the noxious rays of ultra violet light but does not exclude the rays effecting tanning of the skin, which medium contains a fatty vehicle and, homogeneously dissolved therein as the light absorbing agent, a small quantity of a practically colorless, non-poisonous compound corresponding to the general formula

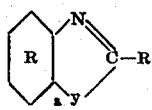

in which R denotes an aromatic radical and $y$ denotes an imido or methylene group, oxygen or sulfur, which compound has a high and simultaneously steep slope of the absorption curve towards the shorter wave length in the range between about 320 and about 350 m$\mu$, said slope corresponding to an increase of the logarithm of the molar extinction coefficient by at least 1 within a range of 10 m$\mu$, so that at least the value 3.2 is reached.

4. A medium which protects the human skin from the noxious rays of ultra violet light but does not exclude the rays effecting tanning of the skin, which medium contains a fatty vehicle and, homogeneously dissolved therein as the light absorbing agent, a small quantity of a practically colorless, non-poisonous aryl-benzimidazole, which compound has a high and simultaneously steep slope of the absorption curve towards the shorter wave length in the range between about 320 and about 350 m$\mu$, said slope corresponding to an increase of the logarithm of the molar extinction coefficient by at least 1 within a range of 10 m$\mu$, so that at least the value 3.2 is reached.

5. A medium which protects the human skin from the noxious rays of ultra violet light but does not exclude the rays effecting tanning of the skin, which medium contains a fatty vehicle and, homogeneously dissolved therein as the light absorbing agent, a small quantity of a practically colorless, non-poisonous phenyl-benzimidazole, which compound has a high and simultaneously steep slope of the absorption curve towards the shorter wave length in the range between about 320 and about 350 m$\mu$, said slope corresponding to an increase of the logarithm of the molar extinction coefficient by at least 1 within a range of 10 m$\mu$, so that at least the value 3.2 is reached.

6. A medium which protects the human skin from the noxious rays of ultra violet light but does not exclude the rays effecting tanning of the skin, which medium contains a fatty vehicle and, homogeneously dissolved therein as the light absorbing agent, a small quantity of phenyl-benzimidazole sulfonic acid sodium salt.

7. A medium which protects the human skin from the noxious rays of ultra violet light but does not exclude the rays effecting tanning of the skin, which medium contains a fatty vehicle and, homogeneously dissolved therein as the light absorbing agent, a small quantity of a practically colorless, non-poisonous aryl-benzoxazole, which compound has a high and simultaneously steep slope of the absorption curve towards the shorter wave length in the range between about 320 and about 350 m$\mu$, said slope corresponding to an increase of the logarithm of the molar extinction coefficient by at least 1 within a range of 10 m$\mu$, so that at least the value 3.2 is reached.

8. A medium which protects the human skin from the noxious rays of ultra violet light but does not exclude the rays effecting tanning of the skin, which medium contains a fatty vehicle and, homogeneously dissolved therein as the light absorbing agent, a small quantity of a practically colorless, non-poisonous phenyl-benzoxazole.

9. A medium which protects the human skin from the noxious rays of ultra violet light but does not exclude the rays effecting tanning of the skin, which medium contains a fatty vehicle and, homogeneously dissolved therein as the light absorbing agent, a small quantity of 2-(p-methoxyphenyl)-benzimidazole.

10. A medium which protects the human skin from the noxious rays of ultra violet light but does not exclude the rays effecting tanning of the skin, which medium contains as the light absorbing agent a practically colorless, non-poisonous organic substance which has a high and simultaneously steep slope of the absorption curve towards the shorter wave length in the range between about 320 and about 350 m$\mu$, said slope corresponding to an increase of the logarithm of the molar extinction coefficient by at least 1 within a range of 10 m$\mu$, so that at least the value 3.2 is reached.

11. A medium which protects the human skin from the noxious rays of ultra violet light but does not exclude the rays effecting tanning of the skin, which medium contains as the light absorbing agent a practically colorless, non-poisonous organic substance which has a high and simultaneously steep slope of the absorption curve towards the shorter wave length at about 325 m$\mu$, said slope corresponding to an increase of the logarithm of the molar extinction coefficient by at least 1 within a range of 10 m$\mu$, so that at least the value 3.2 is reached.

12. A medium which protects the human skin from the noxious rays of ultra violet light but does not exclude the rays effecting tanning of the skin, which medium contains an organic film-forming vehicle and, homogeneously dissolved therein, as the light absorbing agent, a small quantity of a practically colorless substance corresponding to the general formula

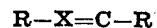

in which R denotes an aromatic radical and X denotes nitrogen or a methine group, and having a high and simultaneously steep slope of the absorption curve towards the shorter wave length in the range between about 320 and about 350 m$\mu$, said slope corresponding to an increase of the logarithm of the molar extinction coefficient by at least 1 within a range of 10 m$\mu$, so that at least the value 3.2 is reached.

13. A medium which protects the human skin from the noxious rays of ultra violet light but does not exclude the rays effecting tanning of the skin, which medium contains a fatty vehicle and, homogeneously dissolved therein, as the light absorbing agent, a small quantity of a practically colorless, non-poisonous compound corresponding to the formula

R—X=C—R in which R denotes an aromatic radical and X denotes nitrogen or a methine group, and having a high and simultaneously steep slope of the absorption curve towards the shorter wave length in the vicinity of 325 m$\mu$, said slope corresponding to an increase of the logarithm of the molar extinction coefficient by at least 1 within a range of 10 m$\mu$, so that at least the value 3.2 is reached.

ERICH MERKEL.
CHRISTIAN WIEGAND.